June 10, 1941.   A. MOESSINGER   2,245,352
CONTROL FOR APPARATUS FOR MOVING LENGTHS OF MATERIAL
Filed July 13, 1937   2 Sheets-Sheet 1
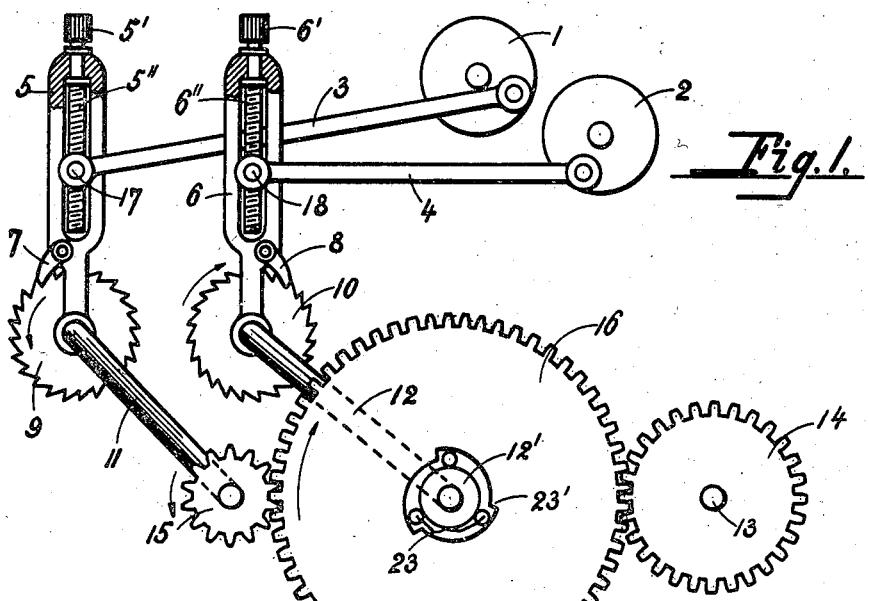
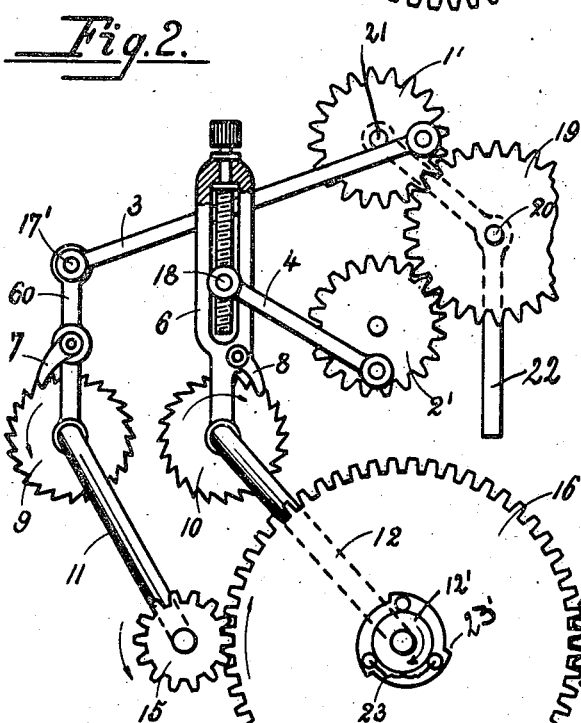
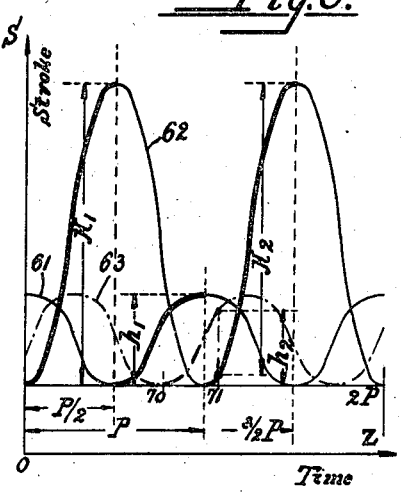
Inventor
Albert Moessinger
per Karl A. ...
Attorney.

June 10, 1941.   A. MOESSINGER   2,245,352
CONTROL FOR APPARATUS FOR MOVING LENGTHS OF MATERIAL
Filed July 13, 1937   2 Sheets-Sheet 2

Inventor
Albert Moessinger
per Karl A. Mayr
Attorney

Patented June 10, 1941

2,245,352

UNITED STATES PATENT OFFICE 2,245,352

CONTROL FOR APPARATUS FOR MOVING LENGTHS OF MATERIAL

Albert Moessinger, Zurich, Switzerland, assignor to Tefag Textil-Finanz A. G., Winterthur, Switzerland Application July 13, 1937, Serial No. 153,349
In Switzerland August 1, 1936

8 Claims. (Cl. 74—119)

The present invention relates to an apparatus for controlling the motion of lengths of material for example woven material, particularly in looms for weaving having two stagewise controllable variable speed transmissions, which act on the length of material by means of common driven means or power flow uniting means which may be a differential gear which adds up or subtracts the actions of said transmissions.

It is an object of the present invention to provide an apparatus for controlling the motion of woven fabric, in which apparatus the transmissions for effecting a rough or a fine motion are provided and act with such different speed ratios by means of a common driven means on the member which controls the motion of the length of fabric, that the range within which the speed may be varied by means of the transmission which effects a fine adjustment is approximately equal to one stage of the variable speed gear for the rough adjustment.

Installations in looms for weaving are known in which the speed of the fabric is changed by changing the length of a pawl lever. With such devices, the density of the fabric can be changed only within narrow limits; greater changes must be effected by exchanging change wheels which are disposed in between the drive of the fabric and the roller carrying the fabric. Such an exchange of gear wheels takes time and cannot be carried out during the operation of the loom. The fabric may get greasy or soiled by such an exchange operation.

It has been further proposed to drive the length of material in looms for weaving by means of two variable speed gears with the assistance of a differential gear which may be constructed in the form of a planetary gear. However, the speed ratio at which the two variable speed gears act on the member which moves the material was not chosen in such manner that the total speed changing range of one gear was approximately corresponding to one speed changing stage of the other gear, but in the known cases the range of one variable speed gear covered a plurality of speed changing stages of the other gear, whereby the number of effective speed changing stages was effectively reduced.

An object of the present invention resides in the provision of an apparatus for changing speed of the motion of the fabric in looms for weaving, said apparatus comprising two variable speed gears and in which apparatus the number of speeds which can be effected is equal to the product of the number of speed changing stages of one gear and that of the other gear.

The speed changing transmission according to this invention may be constructed in the form of a pawl-transmission or as friction transmission. The differential gear may be built in the form of a planetary gear or it may comprise a pawl-transmission by means of which the motions of the speed changing transmission are transmitted with such a time lag to the member driving the fabric that at least a part of the fine motion is added to the rough motion; in such cases, speed adjustment is effected by changing the time lag of the material control motions. The speed changing mechanism according to the present invention may be directly connected with the warp beam or the fabric beam of the textile machine, for example, a loom for weaving, a stitching machine etc. It may also be connected with and/or act on an intermediary or indirect control beam or transporting roller. The present invention can also be applied to dyeing machines, cleaning machines, paper making and similar machines through which a length of material must be moved at variable speeds.

Further and other objects of the present invention will be hereinafter set forth in the accompanying specification and claims and shown in the drawings which, by way of illustration, show what I now consider to be a preferred embodiment of my invention.

The drawings show three embodiments of the present invention in simplified, diagrammatic manner.

In the drawings:

Fig. 1 illustrates a diagrammatic layout of a mechanism according to the present invention.

Fig. 2 illustrates a diagrammatic layout of a modified mechanism according to the present invention.

Fig. 3 shows the timing of the motions of members of the mechanism according to Fig. 2 in a diagrammatic manner.

Fig. 4 is a view from the left into the apparatus shown in Fig. 5 with the right casing wall removed.

Like numerals designate like parts in all the figures of the drawings.

Figure 5:
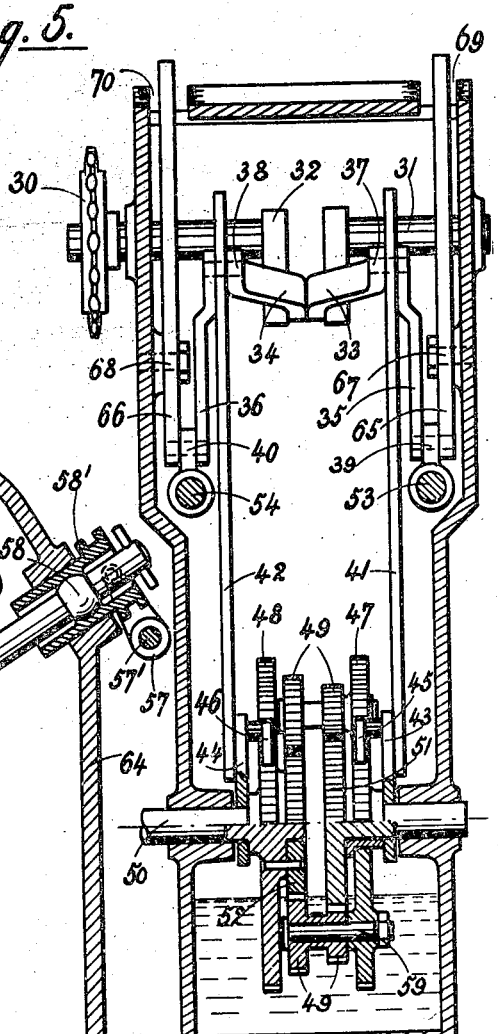
Fig. 5 shows a part sectional front view of the apparatus shown in Fig. 4 and with the wall shown on the left of Fig. 4 removed.

Referring more particularly to Fig. 1 of the drawings: 1 and 2 are crank discs driven by a loom, which discs act by means of rods 3 and 4 on the swing levers 5 and 6, respectively. The swinging motion of said levers is transmitted by means of pawls 7 and 8, respectively, to the ratchet wheels 9 and 10, respectively, which are keyed to shafts 11 and 12, respectively. The latter is keyed to a disc 12' which forms the central part of a free wheel coupling comprising rollers 23 and teeth 23' which are part of tooth wheel 16. Shaft 11 is keyed to tooth wheel 15.

The fabric is advanced by means of shaft 13 to which tooth wheel 14 is keyed. The swinging motion of the levers 5 and 6 is transmitted by means of the ratchet and the tooth wheels 15 and 16 to the control shaft 13. The swinging levers 5 and 6 each comprise a slot in which, by means of threaded members 5" and 6", link-pins 17 and 18 can be moved towards and from the fulcrum of the levers. For more convenient manipulation, members 5" and 6" are provided with handle knobs 5' and 6'. To link-pins 17 and 18, rods 3 and 4, respectively, are revolvably connected. The further the link-pins are removed from the center of the swinging motion of levers 5 and 6, the less teeth of wheels 9 and 10 are caught by pawls 7 and 8. The more the pins are moved towards the fulcrum of the levers, the more teeth are caught at each swinging motion.

The two speed changing gears 3, 5, 7, 9 and 4, 6, 8, 10 act on the gear 15, 16, 12', 23, 23' at such different speed ratios that the total range of the gear 3, 5, 7, 9 for the fine motion corresponds approximately to one speed changing stage of the gear 4, 6, 8, 10 for the rough motion. Through the variable speed transmission for the rough adjustment and shaft 12, crank 2 effects a movement to the right of wheel 16 which causes movement to the left of tooth wheel 14. Crank 1, which causes the fine adjustment, effects, by means of the variable speed gear 5, 7, 9 and the shaft 11, a motion to the left tooth wheel 15, which causes a right motion of wheel 16, which latter causes a left motion of wheel 14. Cranks 1 and 2 are so set with respect to one another that wheel 15 causes a clockwise motion of wheel 16 only when shaft 12 stands still and pawl 8 moves freely over the teeth of wheel 10. At this motion, coupling 12', 23, 23' is disengaged so that no motion is transmitted backwards to shaft 12. Vice versa, a clockwise movement is transmitted to wheel 16 through shaft 12 only when tooth wheel 15 is not driven by means of the speed changing gear 5, 7, 9. Thereby, wheel 15 is also moved counterclockwise by means of wheel 16 which has no other effect than that wheel 9 moves freely with respect to pawl 7. The diameters of wheels 15 and 16 are so chosen that, when moving slide pin 17 to its full extent, the same change of speed takes place as if pin 18 is moved so far that pawl 8 catches just one tooth more or one tooth less of wheel 10. The control of the motion of the fabric can thus be changed within each stage of transmission 6, 8, 10 for the rough adjustment by means of gear 5, 7, 9 for the fine adjustment in many fine stages.

The speed changing apparatus according to Fig. 2 is similarly constructed as that shown in Fig. 1. The loom however drives only disc 2' directly, whereas crank disc 1' is operated by means of a tooth wheel 19 revolvable about fulcrum 20 which is stationary. Fulcrum 21 of disc 1 is mounted to lever 22 by means of which it can be revolved about fulcrum 20.

Movement of lever 22 causes change of timing of the swinging motions of lever 60 which corresponds to lever 5 in Fig. 1, with respect to lever 6. With the aid of the free wheel coupling 12', 23, 23', the total movement or a greater or smaller part of the movement of the speed changing transmission 5, 7, 9 for the fine adjustment can be transmitted to shaft 13.

This change of timing of the swinging motions is illustrated in the diagram Fig. 3. In this diagram, the abscissae represent the time Z, for example, in seconds, and the ordinates the amplitudes S of the swinging or the strokes of the levers 60 and 6. Curve 61 represents the motion of lever 60 in the gear for fine adjustment and curve 62 the swinging motion of lever 6 in the gear for rough adjustment, whereby the scales for the distances S are chosen in correspondence with the various transmission ratios according to the diameters of the tooth wheels 15 and 16 in Fig. 2 so that the ordinates in Fig. 3 are a direct image of advance action of the apparatus on the length of material. The movements of the motions of levers 60 and 6 are displaced with respect to one another by the time $p/2$ which is one half of the time of one total period of motion $p$ of the length of material. By means of the gear for rough motion, the length of material is moved forwards during the time $p/2$ for a distance which is represented by $H_1$ in the diagram. From the moment $p/2$ to the moment $p$, the gear for the rough movement cannot have any action on the material because, during this time, the pawl runs idle over the teeth of the ratchet. By means of the gear for fine motion, however, the material is moved for a further distance which corresponds to the distance designated by $h_1$. During the time $p/2$, the gear for fine motion has carried out its return motion.

The motions are transmitted differently when the motion of the speed changing gear for the fine motion takes place at a different time interval with respect to the motion of the gear for the rough motion, for example, in such manner as is represented by means of curve 63 shown in a dash and dotted line. In this case, for example, the gear for the fine movement begins to act at the moment 70 on the length of material and to move the material until the moment 71. During the time between abscissa 70 and 71, the fine movement overtakes the still slower rough movement which does not begin to act before the moment $p$. At the moment 71, the speed of the rough movement is equal to that of the fine movement according to the equal inclination of curves 62 and 63 so that the coupling 12', 23, 23' is engaged and from now on transmits the rough movement only to the length of material, whereas the teeth of the gear for the fine movement run freely with respect to their pawl. From moment 71 until moment $3/2p$, the gear for the rough movement effects a movement of the length of material which corresponds to the value $H_2$, whereas, in the previous period 70 to 71, a motion is made which corresponds to the value $h_2$. The material is, therefore, advanced less than if the movement of the gears were set at an interval of exactly one half period. By further increasing or decreasing the intervals, further changes in the movement of the material can be obtained.

Figure 4:
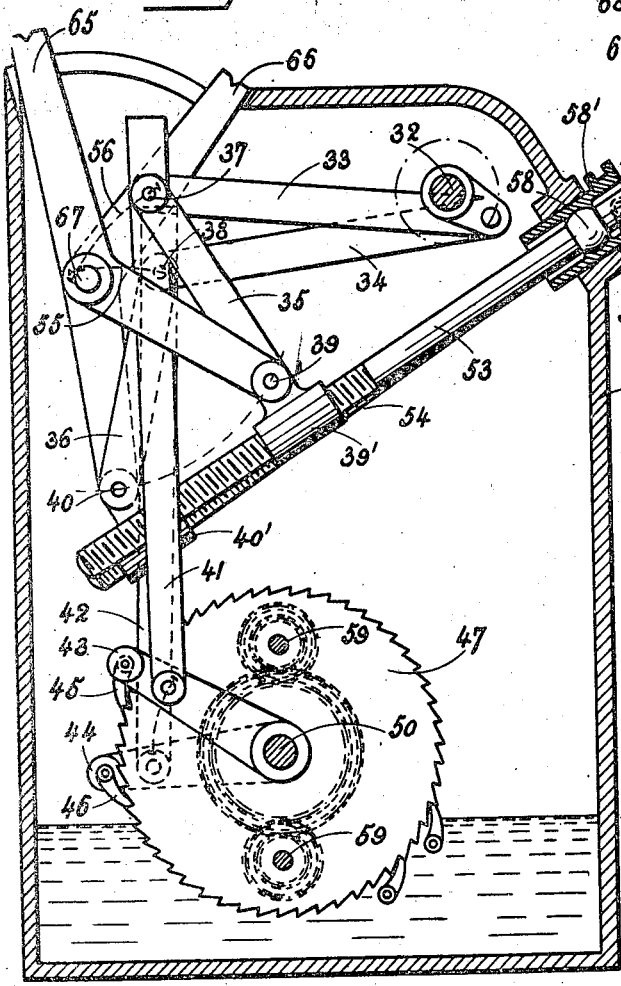
Fig. 4 illustrates a part sectional side view of a modification of the apparatus according to the present invention.

Figs. 4 and 5 show an embodiment of the present invention having two gears which act on planetary gears. Crank 32 is driven by the loom by means of a sprocket wheel 30 and a shaft 31 and causes a swinging motion of the levers 35 and 36 to which it is connected by means of the rods 33 and 34. The link-pins 37 and 38, which connect levers 35 and 36 with rods 33 and 34, respectively, carry out a circular movement as indicated by dotted lines 55, 56 about the fulcrums 39 and 40 of the swinging levers 35 and 36.

To the link-pins 37 and 38, respectively, also connecting rods 41, 42 are linked, which rods impart a swinging motion to the levers 43 and 44. The swinging motion is transmitted to the ratchet wheels 47 and 48 by means of the pawls 45 and 46.

Ratchet wheel 47 is rotatable with respect to shaft 50 and carries two bolts 59, each of which revolvably carries a pair of tooth wheels 49' and 49 which respectively engage a tooth wheel 51 which is rigidly connected to shaft 50 and a tooth wheel 52 which is rigidly connected with the ratchet wheel 48 and supported by a shaft 50'. Shafts 50 and 50' are revolvable in casing 64.

Crank 32 imparts great motive impulses to shaft 50 by means of rods 34 and 42, the swinging lever 44, the pawl 46, the tooth wheel 52, the pairs of tooth wheels 49, and the tooth wheel 51. A fine movement is transmitted to shaft 50 by means of the rods 33 and 41, the swinging lever 43, the pawl 45, the ratchet wheel 47, the bolts 59, the pairs of tooth wheels 49, and the tooth wheel 51.

For adjustment of the rough motion and of the fine movement, two spindles 53 and 54 are provided which can be revolved by hand. The lower end of the spindles is threaded and carries nut members 39' and 40' which carry fulcrums 39 and 40. By turning the spindles, the position of the fulcrums 39 and 40 is changed so that the arcs along which the fulcrums 37 and 38 move assume a more or less inclined position with respect to the rods 41 and 42. If the position of the arcs is approximately perpendicular to the rods 41 and 42 as is, for example, arc 55, a small movement only is imparted to lever 44. If the arc is inclined with respect to the rod as is, for example, arc 56, the movement imparted to levers 44 or 43 is greater and consequently the speed of shaft 50.

The position of the axial bearings 58 of the spindles 53 and 54 can be changed individually or jointly by individually or jointly moving said bearings in axial direction by revolving levers 57 manually or by means of an automatic governor. Lever 57 carries a pin which engages an annular groove in the slide member 58'. Upon movement of lever 57 about its fulcrum 57', slide member 58' is moved axially in casing 64 and takes with it the axial bearing member 58 which is rigidly connected with rod 53 or 54 and revolvable in slide member 58'. By these means, an adjustment can be accomplished besides the adjustment of the positions of fulcrums 39 and 40 by revolving the rods 53 and 54.

This adjustment may be carried out, for example, in dependence on the diameter of the roll of wound up finished fabric. With the displaceable supports or nut members 39' and 40', indicating arms 65 and 66, respectively, are connected which are swingable about axles 67 and 68, respectively, and project from casing 64 through slots 69 and 70, respectively. The position of the free ends of members 65 and 66 which project from said slots indicates the position of the displaceable supports 39' and 40'.

While I believe the above described embodiments of my invention to be preferred embodiments, I wish it to be understood that I do not desire to be limited to the exact details of design and construction shown and described, for obvious modifications will occur to a person skilled in the art.

What I claim is:

1. A power transmission comprising in combination a plurality of individual power transmitting means arranged in parallel with respect to the flow of power, power flow uniting means connected with and operatively inter-connecting said individual transmitting means, said power flow uniting means comprising speed changing means individually associated with and driven by said individual power transmitting means and having individually different speed changing ratios, and adjustable power apportioning means connected with one of said indivdual transmitting means and being adapted to adjustably control the amount of power flowing through the means with which it is connected to said power flow uniting means while said mechanism is in operation.

2. A power transmission comprising in combination a plurality of individual, stepwise acting power transmitting means arranged in parallel with respect to the flow of power, power flow uniting means connected with and operatively interconnecting said individual transmitting means, and adjustable power apportioning means individually connected with said individual transmitting means and being adapted to individually adjustably control the extent of the stepwise actions of said transmitting means while said mechanism is in operation, said power uniting means comprising speed changing means connected with one of said power transmitting means and having such speed changing ratio that the greatest stepwise action of the power transmitting means with which it is connected is not greater than the smallest stepwise action of another of said individual power transmitting means.

3. A power transmission comprising a driving crank, a differential gear, a plurality of substantially reciprocatingly moving individual power transmitting means which are arranged in parallel with respect to the flow of power therethrough and which interconnect said crank and said gear, individual stroke adjusting means individually connected with said power transmitting means and being adapted to be individually adjusted while said transmission is in operation whereby the driving action of said individual transmitting means on said differential gear may be changed individually.

4. A power transmission comprising a plurality of power transmitting means, a differential gear operatively connected with and driven by said speed changing means, each of said power transmitting means comprising a crank, connecting means connected to said crank and comprising a plurality of members movably linked together by means of hinge means, adjustable guide means connected with said hinge means and guiding and adjusting the extent and direction of the movements of said hinge means and of said connecting means and, thereby, the action of said power transmitting means on said differential gear.

5. A power transmission comprising a plurality of power transmitting means, a differential gear operatively connected with and driven by said power transmitting means, each of said power transmitting means comprising a crank, a connecting member movably connected to said crank, another connecting member, a hinge means movably connecting both said connecting members, a lever carrying a ratchet pawl and being linked to the free end of said other connecting member and being swingable about the central axis of rotation of said differential gear, said differential gear comprising a ratchet wheel which is adapted to be actuated by said ratchet pawl, a link lever being swingable about a displaceable fulcrum and supporting and guiding said hinge member and, upon displacement of said fulcrum, changing the path of said hinge member and, thereby, also changing the speed of said other connecting member acting on said ratchet lever and the rate of drive of said ratchet wheel and differential gear.

6. A power transmission comprising a plurality of intermittently substantially reciprocatingly acting driving means, speed changing means having different speed changing ratios individually connected with said driving means, a common driven means operatively connected with and driven by said speed changing means, and speed adjusting means individually connected with said driving means and being adapted to be operated while said transmission is in operation.

7. A power transmission comprising a plurality of stepwise acting driving means, a differential gear operatively connected with and driven by said means, a speed changing means operatively connected with and driven by one of said driving means and being disposed intermediary said driving means with which it is connected and said differential gear, another speed changing means operatively connected with and driven by another of said driving means and being disposed intermediary said driving means with which it is connected and said differential gear and having a speed changing ratio which is permanently different from the speed changing ratio of said first mentioned speed changing means and which changes the speed at one step at a rate which is substantially equal to the total speed changing range of the other of said speed changing means.

8. A power drive particularly for the drive of the breast beam in looms for weaving, comprising two individual power transmissions, a common speed changing gearing connected with and operated by both said power transmissions, said power transmissions being of the ratchet type and individually comprising pawls, reciprocatingly operated pawl drive means connected with and operating said pawls, ratchet wheels individually connected with and forming part of and being operatively interconnected by said gearing and alternately individually actuated by said pawls, timing means connected with said drive means and timing the operation of said pawls and actuation of said ratchet wheels and adding action of one of said transmissions on said gearing to the action of the other of said transmissions on said gearing in a predetermined proportion.

ALBERT MOESSINGER.